(12) United States Patent
McDonald

(10) Patent No.: US 6,818,841 B1
(45) Date of Patent: Nov. 16, 2004

(54) NON-DISRUPTIVE COMPUTER-CONTROLLED IN-LINE CONVEYOR FLOW WEIGHT CALIBRATION SCALE

(76) Inventor: Ralph R. McDonald, 210 N. James St., Carlsbad, NM (US) 88220

( * ) Notice: Subject to any disclaimer, the term of this patent is extended or adjusted under 35 U.S.C. 154(b) by 207 days.

(21) Appl. No.: 10/075,959

(22) Filed: Feb. 14, 2002

(51) Int. Cl.⁷ .......................... G01G 23/01; G01G 11/00
(52) U.S. Cl. ............................ 177/16; 177/50; 177/119; 73/1.13
(58) Field of Search ............................ 177/16, 50, 119; 73/1.13

(56) References Cited

U.S. PATENT DOCUMENTS

| | | | |
|---|---|---|---|
| 2,974,518 A | * 3/1961 | Jones ........................ | 73/1.13 |
| 3,656,337 A | * 4/1972 | McDonald ................. | 73/1.13 |
| 3,850,023 A | * 11/1974 | McDonald ................. | 73/1.13 |
| 3,899,915 A | 8/1975 | Williams, Jr. et al. ....... | 73/1.13 |
| 3,976,150 A | * 8/1976 | Wilson et al. ................. | 177/16 |
| 3,979,943 A | 9/1976 | Foster ........................ | 73/1.13 |
| 4,194,649 A | 3/1980 | Bullivant et al. ............. | 222/55 |
| 4,353,427 A | 10/1982 | Stock et al. ................... | 177/50 |
| 4,418,773 A | * 12/1983 | Finet et al. .................... | 177/16 |
| 4,499,984 A | 2/1985 | Tuten et al. ................ | 194/212 |
| 4,509,609 A | 4/1985 | Meiring ....................... | 177/1 |
| 4,529,050 A | * 7/1985 | Mosher et al. ................ | 177/50 |
| 4,660,662 A | * 4/1987 | Katz ........................... | 177/50 |
| 4,709,770 A | * 12/1987 | Kohashi et al. ............... | 177/50 |
| 4,751,661 A | * 6/1988 | Amacher et al. ............ | 73/1.13 |
| 5,119,893 A | * 6/1992 | Jost .............................. | 177/16 |
| 5,423,456 A | 6/1995 | Arendonk et al. ............ | 222/54 |
| 5,686,653 A | * 11/1997 | Homer et al. ................. | 73/1.13 |
| 5,736,685 A | 4/1998 | Nakajima .................... | 177/145 |
| 5,877,456 A | * 3/1999 | Homer et al. ................. | 177/50 |
| 5,900,591 A | 5/1999 | Liubakka ...................... | 177/50 |
| 6,437,255 B1 | * 8/2002 | Ludescher ................... | 177/16 |

* cited by examiner

*Primary Examiner*—Randy W. Gibson
(74) *Attorney, Agent, or Firm*—Parsons & Goltry; Robert A. Parsons; Michael W. Goltry

(57) ABSTRACT

Disclosed is a weighing system that is capable of continually sensing load against a conveyor and a calibration system for the weighing system that is capable of applying a reference load to the weighing system without interrupting the ability of the weighing system to sense load against the conveyor.

15 Claims, 3 Drawing Sheets

US 6,818,841 B1

NON-DISRUPTIVE COMPUTER-CONTROLLED IN-LINE CONVEYOR FLOW WEIGHT CALIBRATION SCALE

FIELD OF THE INVENTION

This invention relates to weight sensing systems for article transporting conveyors and to associated calibration systems.

BACKGROUND OF THE INVENTION

Weighing systems for conveyor assemblies that transport articles along a specified path are well known. Because of the prolonged and continual operation of such weighing systems, recalibration is often required in order to maintain consistent and accurate weight measurements. For many calibration systems, it is necessary to temporarily interrupt the operation of the conveyor in order facilitate a calibration event, often resulting in recalibration of the weighing system. This checking procedure not only required the attention of personnel but also involved a loss of production time because of the interruption in conveyor operation. Other calibration systems do not require interruption of the conveyer but require an interruption of the operation of the weighing system, which is unfortunate because it prevents the weighing system from weighing material on the conveyor. Given these and other deficiencies in the art, the need for certain new and useful improvements is evident.

SUMMARY OF THE INVENTION

The above problems and others are at least partially solved and the above purposes and others realized in a first embodiment of the invention, which is characterized by a new and novel combination consisting of a weighing system that is capable of continually sensing load against a continuously moving conveyor and a calibration system for the weighing system that is capable of applying a reference load to the weighing system without interrupting the ability of the weighing system to sense load against the conveyor. In a preferred embodiment, the weighing system consists of a pivoted scale engaging the conveyor and a sensor that is capable of producing load stimulus in response to displacement of the pivoted scale by load applied against the conveyor. The calibration system consists of a reference load capable of being displaced and the sensor capable of producing test load stimulus in response to displacement of the pivoted scale by load applied against the conveyor and displacement of the reference load. A pivoted test beam supports the reference load, which is capable of pivoting between a first position and a second position displacing the reference load. An engine is associated with the pivoted test beam and is movable between a first condition corresponding to the first position of the test beam and a second condition corresponding to the second position of the test beam. Preferably, the invention is furnished with storage maintaining load stimulus data from the sensor commensurate with load applied to the conveyor and a test load stimulus data from the sensor commensurate with a combination of load applied to the conveyor and displacement of the reference load, and a controller that is capable of comparing the load stimulus data to the test load stimulus data and adjusting the weighing system if the comparison of the load stimulus data and the test load stimulus data is unacceptable.

In a conveyor continuously moving material, the material applying load to the conveyor, another embodiment of the invention proposes a weighing system that is capable of continually sensing load against the conveyor and a calibration system for the weighing system that is capable of applying a reference load to the weighing system without interrupting the ability of the weighing system to sense. load against the conveyor. In this preferred embodiment, the weighing system consists of a pivoted scale engaging the conveyor and a sensor that is capable of producing load stimulus in response to displacement of the pivoted scale by load applied against the conveyor. The calibration system consists of a reference load capable of being displaced and the sensor capable of producing test load stimulus in response to displacement of the pivoted scale by load applied against the conveyor and displacement of the reference load. A pivoted test beam supports the reference load, which is capable of pivoting between a first position and a second position displacing the reference load. An engine is associated with the pivoted test beam and is movable between a first condition corresponding to the first position of the test beam and a second condition corresponding to the second position of the test beam. Preferably, the instant embodiment of invention is furnished with storage maintaining load stimulus data from the sensor commensurate with load applied to the conveyor and a test load stimulus data from the sensor commensurate with a combination of load applied to the conveyor and displacement of the reference load, and a controller that is capable of comparing the load stimulus data to the test load stimulus data and adjusting the weighing system if the comparison of the load stimulus data and the test load stimulus data is unacceptable.

In yet another preferred embodiment the invention consists of a conveyor, a weighing system consisting of a load sensor and a scale displaced by the conveyor so as to act on the load sensor, and a reference load capable of being displaced so as to act on the load sensor. In this embodiment, a pivoted test beam supports the reference load, which is movable between a first position and a second position displacing the reference load. An engine is associated with the pivoted test beam and is movable between a first condition corresponding to the first position of the test beam and a second condition corresponding to the second position of the test beam. Preferably, this embodiment of the invention is further furnished with storage maintaining load stimulus data from the load sensor commensurate with load applied to the conveyor and a test load stimulus data from the load sensor commensurate with a combination of load applied to the conveyor and displacement of the reference load, and a controller capable of comparing the load stimulus data to the test load stimulus data and adjusting the weighing system if the comparison of the load stimulus data and the test load stimulus data is unacceptable.

Consistent with the foregoing the invention also contemplates associated methods. In a preferred embodiment, an exemplary method of the invention is carried out in a conveyor and a weighing system that is capable of continually sensing load against the conveyor and generating load stimulus commensurate with the load against the conveyor. The method consists of applying a reference load to the weighing system, generating test load stimulus commensurate with a combination of the load against the conveyor and the reference load against the weighing system, comparing the test load stimulus with the load stimulus, and adjusting the weighing system if the comparison of the load stimulus and the test load stimulus is unacceptable. Preferably, a load cell generates the test load stimulus, and a controller carries out the comparison and adjusting tasking events. However, these events can be carried out manually if desired.

BRIEF DESCRIPTION OF THE DRAWINGS

Referring to the drawings.

DETAILED DESCRIPTION OF PREFERRED EMBODIMENTS

In general, the invention is a new and novel combination consisting of a weighing system that is capable of continually sensing load against a continuously moving conveyor and a calibration system for the weighing system that is capable of applying a reference load to the weighing system without interrupting the ability of the weighing system to sense load against the conveyor. In a preferred embodiment, the weighing system consists of a pivoted scale engaging the conveyor and a sensor that is capable of producing load stimulus in response to displacement of the pivoted scale by load applied against the conveyor. The calibration system consists of a reference load capable of being displaced and the sensor capable of producing test load stimulus in response to displacement of the pivoted scale by load applied against the conveyor and displacement of the reference load. A pivoted test beam supports the reference load, which is capable of pivoting between a first position and a second position displacing the reference load. An engine is associated with the pivoted test beam and is movable between a first condition corresponding to the first position of the test beam and a second condition corresponding to the second position of the test beam. Preferably, the invention is furnished with storage maintaining load stimulus data from the sensor commensurate with load applied to the conveyor and a test load stimulus data from the sensor commensurate with a combination of load applied to the conveyor and displacement of the reference load, and a controller that is capable of comparing the load stimulus data to the test load stimulus data and adjusting the weighing system if the comparison of the load stimulus data and the test load stimulus data is unacceptable.

Figure 1:
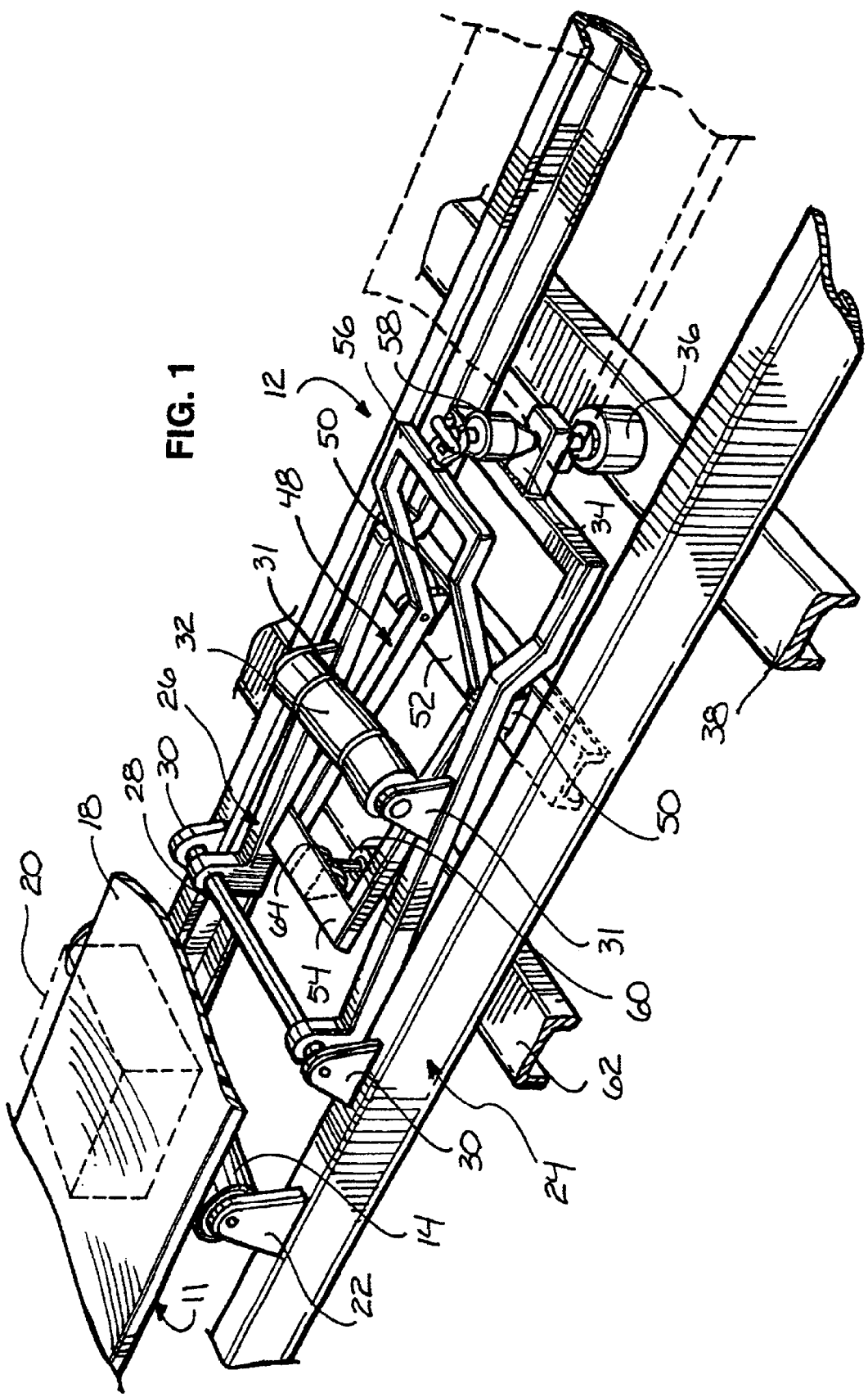
FIG. 1 is a perspective view of a conveyor associated with a weighing and calibrating system, in accordance with the principal of a preferred embodiment of the invention.
Figure 2:
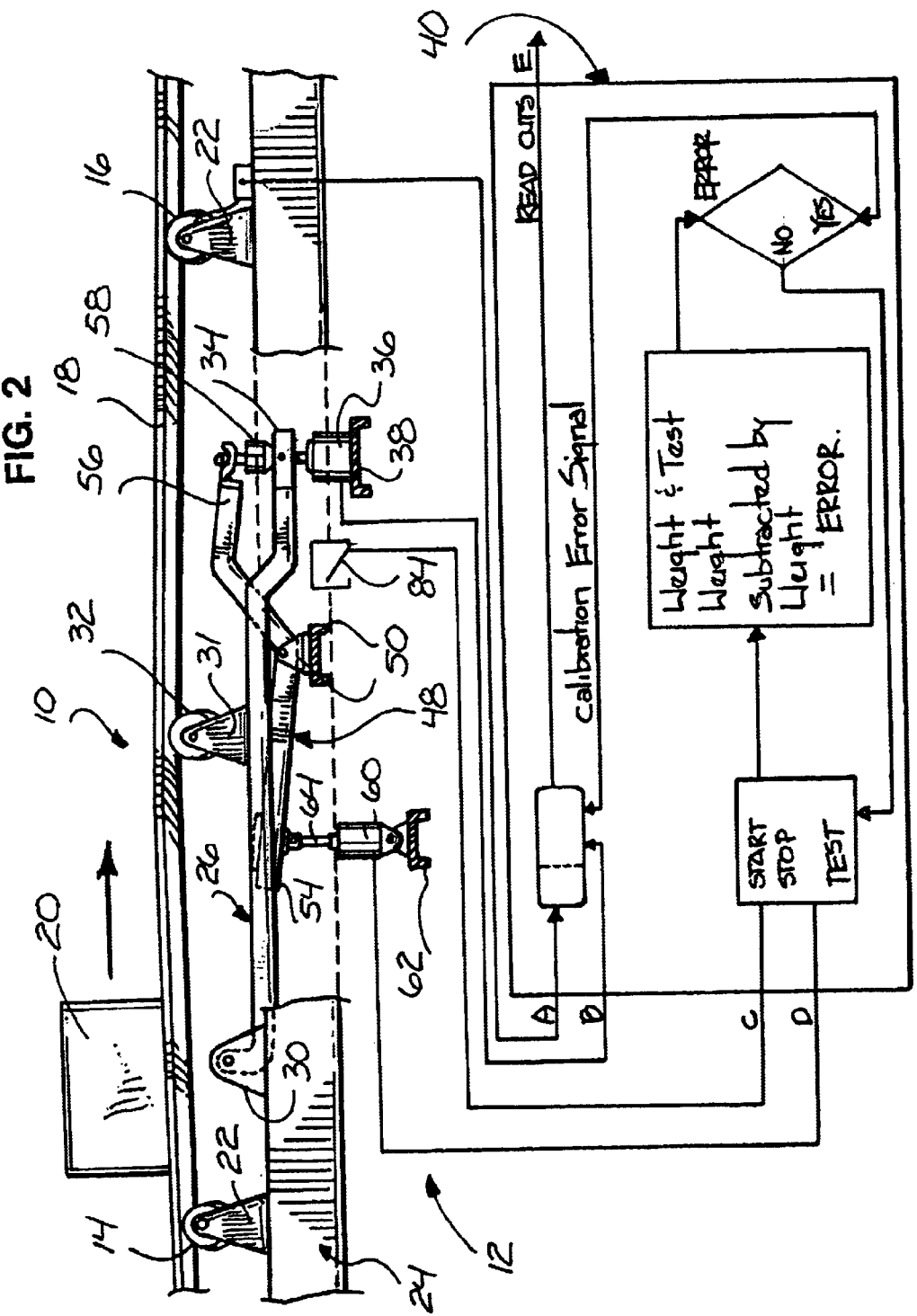
FIG. 2 is a diagrammatic view illustrating the weighing and calibrating system of FIG. 1.

Turning now to the drawings, in which like reference characters indicated corresponding elements throughout the several views, FIGS. 1 and 2 illustrate a preferred embodiment of the invention designated 10, which consists of a continuously moving conveyor 11 associated with a weighing and calibrating system 12 disposed between support rollers 14,16 (roller 16 shown only in FIG. 2) supporting an upper run of an endless conveyor belt 18 of conveyor 11 on which material or articles, such as article 20, are transported in a specified direction. Brackets 22 of a frame 24 associated with conveyor 11 rotatably attach rollers 14,16 for the upper run of conveyor belt 18. Conveyor 11 is maintained in continuous operation for movement of material/articles in the specified direction, which, in this embodiment, is a right hand direction as viewed in FIGS. 1 and 2, with the material/articles thereon moving through a weighing station between support rollers 14,16 so that the weight/load of the material/articles against conveyor belt 18 of conveyor 11 is sensed by weighing system 12.

Weighing system 12 includes a scale beam assembly 26, which is pivoted at one end by, in this specific embodiment, a pivot shaft 28 supported by and between brackets 30 of frame 24 adjacent support roller 14. Scale beam assembly 26 underlies the upper run of conveyor belt 18 and mounts intermediate the ends thereof. Brackets 31 rotatably support a load-applying roller 32, which is maintained in engagement with the underside of the conveyor belt 18 so that the load on conveyor belt 18 is applied to scale beam assembly 26 displacing it and thus permitting it to weigh material/articles carried by conveyor belt 18. The end of scale beam assembly 26 remote from pivot shaft 28 is characterized by an extremity/arm 34 to which is connected a load cell 36, which is mounted on a supporting frame member 38 underlying arm 34. Load cell 36 is any suitable type well known to those skilled in the art, the details of which will readily occur to the skilled artisan.

Load cell 36 is connected to a source of voltage that, in this preferred embodiment, is in the form of a powered computerized processing unit/controller 40 in order to produce load stimulus in the form of a signal output reflecting the load applied to load cell 36 through arm 34 of scale beam assembly 26. The load stimulus from load cell 36 is fed to controller 40 and stored into electronic storage of controller 40. The electronic storage is any suitable type commonly found with conventional personal computers and other ubiquitous computing devices, whether transient/temporary storage or permanent storage. If desired, load cell 36 can be associated with an amplifier transmitter for amplifying the load stimulus or output from load cell 36 and an integrator producing a suitable output to controller 40. Controller 40 appropriately processes and stores into the associated electronic storage the load stimulus of load cell 36. The load stimulus is converted by controller 40 into a measured value that reflects a measurement of load carried by conveyor belt 18. Further details of the operation of controller 40 will be discussed later in this specification.

Also underlying the top run of conveyor belt 18 between support rollers 14,16 is a test beam assembly 48, which is pivotally attached by a fulcrum bracket assembly 50 intermediate the ends thereof. A support frame 52 mounts fulcrum assembly 50 intermediate the ends of scale beam assembly 26 so that one end portion 54 of the test beam assembly 48 underlies scale beam assembly 26 while the other end portion 56 projects upwardly through scale beam assembly 26 and overlies arm 34. A reference weight 58 is suspended from end portion 56 of test beam assembly 48 on one side of fulcrum assembly 50 so that the load thereof is capable of being transferred to arm 34 in response to angular displacement of test beam assembly 48 in a clockwise direction about fulcrum assembly 50 as viewed in FIGS. 1 and 2. Test beam assembly 48 is angularly displaced in this direction in order to displace/transfer reference weight 58 to load cell 36 by an engine, which in this embodiment is a power operated device in the form of an air cylinder mechanism 60. Air cylinder mechanism 60 is pivotally anchored on a support frame 62 underlying end portion 54 of test beam assembly 48 while a piston rod 64 extends upwardly from air cylinder mechanism 60 and is pivotally connected to end portion 54. Although air cylinder mechanism 60 is a preferred engine, other engine forms capable of angularly displacing test beam assembly 48 can be employed without departing from the invention.

Load applying roller 32 is disposed against the underside of conveyor belt 18 bearing the weight of loads disposed on the upper side of conveyor belt 18 displacing scale beam assembly 26. This displacement of scale beam assembly 26 causes arm 34 to act on load cell 36, in which load cell 36 generates output signals, namely, load stimulus, commensurate with the load, force or weight exerted thereagainst by arm 34. In this embodiment, arm 34 acts on load cell 36 with a pressing force. This force can be a pulling force, which is discussed in connection with the embodiment depicted in FIG. 3. Load stimulus/signals generated at load cell 36 are sent to controller 40 and stored into and maintained by electronic storage.

Reference weight 58 is a known weight. Upward displacement of end portion 54 of test beam assembly 48 by air cylinder mechanism 60 transfers reference weight 58 to weighing system 12 and, thus, to load cell 36. This does not disrupt the interaction of conveyor belt 18 with roller 32 and, thus, with scale beam assembly 26. In this regard, and in accordance with the principal of the invention, scale beam assembly 26 is always in operative relationship with conveyor 11. The applied reference weight 58 acts on load cell 36 in addition to the force exerted against load cell 36 by arm 34, in which load cell 36 generates load stimulus commensurate with the force or weight exerted thereagainst by reference weight 58 and the load exerted against scale beam assembly 26 by conveyor 11. In this embodiment, reference weight 58 acts against arm 34 with a pressing force, which pressing force transfers to load cell 36 by way of arm 34. This force can be a pulling force against arm 34 if desired. When reference weight 58 is loaded against load cell 36, the load stimulus generated by load cell 36 are considered test load stimulus or signals, which test load stimulus/signals are sent to controller 40 and stored into and maintained by electronic storage.

Air cylinder mechanism 60 is activated during a test interval to upwardly displace end portion 54 transferring reference weight 58 against arm 34 and, therefore, to load cell 36. Activation of air cylinder assembly 60 is characterized by a pressurization of air cylinder mechanism 60, which, for instance, is, caused by supplying air cylinder assembly 60 with air under pressure through, for example, a line connected by a snubber to one of the outlet ports of a solenoid valve assembly connected to a suitable source of air under pressure. At the end of the test interval, air cylinder mechanism 60 is deactivated to downwardly displace end portion 54 disengaging reference weight 58 from arm 34 and, therefor, from load cell 36. Deactivation of air cylinder mechanism 60 is characterized by a de-pressurization of air cylinder mechanism 60, which, for instance, is caused by relieving air cylinder assembly 60 of air pressure by, for example, interconnecting air cylinder mechanism 60 with the solenoid valve assembly through the snubber.

Closing and opening a switch 84 (FIG. 2), which can be done manually or by controller 40 and preferably by the latter, carries out the activation and deactivation of air cylinder assembly 60. Controller 40 is programmable, and preferably programmed to carry out calibration tests with test arm assembly 48 at regular or specified intervals. In accordance with a preferred embodiment, controller 40 programming governs the frequency with which weighing system 12 is checked for calibration as well as the duration of the test interval during which calibration is checked and automatic adjustment of weighing system 12 effected if necessary.

In a test interval, in which reference weight 58 is loaded to load cell 36 in the manner previously described, test load stimulus is generated by load cell 36 and sent to controller 40 and stored into and maintained by the electronic storage thereof. This test load stimulus, which is commensurate to the weight or load applied by material/articles on conveyor belt 18 plus the weight or load applied by reference weight 58, is compared by controller 40 to stored load stimulus, which is commensurate to the weight or load applied only by material/articles on conveyor belt 18. Controller 40 compares the weight represented by the load stimulus and test load stimulus and calculates the difference between the two, which, if weighing system 12 is calibrated properly, will be equal or at least substantially equal to the weight of reference weight 58, which is a known weight. If as calculated by controller 40 the difference between the weights represented by the load stimulus and the test load stimulus is zero, negligible or otherwise falls within a specified range, controller 40 terminates the test interval deactivating air cylinder assembly 60 removing the load of reference weight 58 from load cell 36. If as calculated by controller 40 the difference between the weights represented by the load stimulus and the test load stimulus is not zero, not negligible or otherwise falls outside a specified range, controller 40 initiates a adjustment or recalibration event for weighing system 12. In this adjustment event, controller 40 adjusts the weighing parameters of weighing system 12 and then initiates another testing event, in which controller 40 accepts another test load stimulus from load cell 36 and compares the weight represented by the new test load stimulus to the weight represented by the load stimulus. If as calculated by controller 40 the difference between the weights represented by the load stimulus and the new test load stimulus is zero, negligible or otherwise falls within a specified range, weighing system 12 is deemed recalibrated and controller 40 terminates the test interval deactivating air cylinder assembly 60 removing the load of reference weight 58 from load cell 36. If as calculated by controller 40 the difference between the weights represented by the load stimulus and the new test load stimulus is not zero, not negligible or otherwise falls outside a specified range, weighing system 12 is deemed not recalibrated and controller 40 initiates another recalibration event. Recalibration events are repeated by controller 40 until weighing system 12 is deemed recalibrated, in which case controller 40 terminates the test interval deactivating air cylinder assembly 60 removing the load of reference weight 58 from load cell 36. It should be noted that although controller 40 is the preferred means of conducting calibration tests for weighing system 12, all of or one or more parts or tasks of the foregoing calibration testing can be effected manually if desired.

Figure 3:
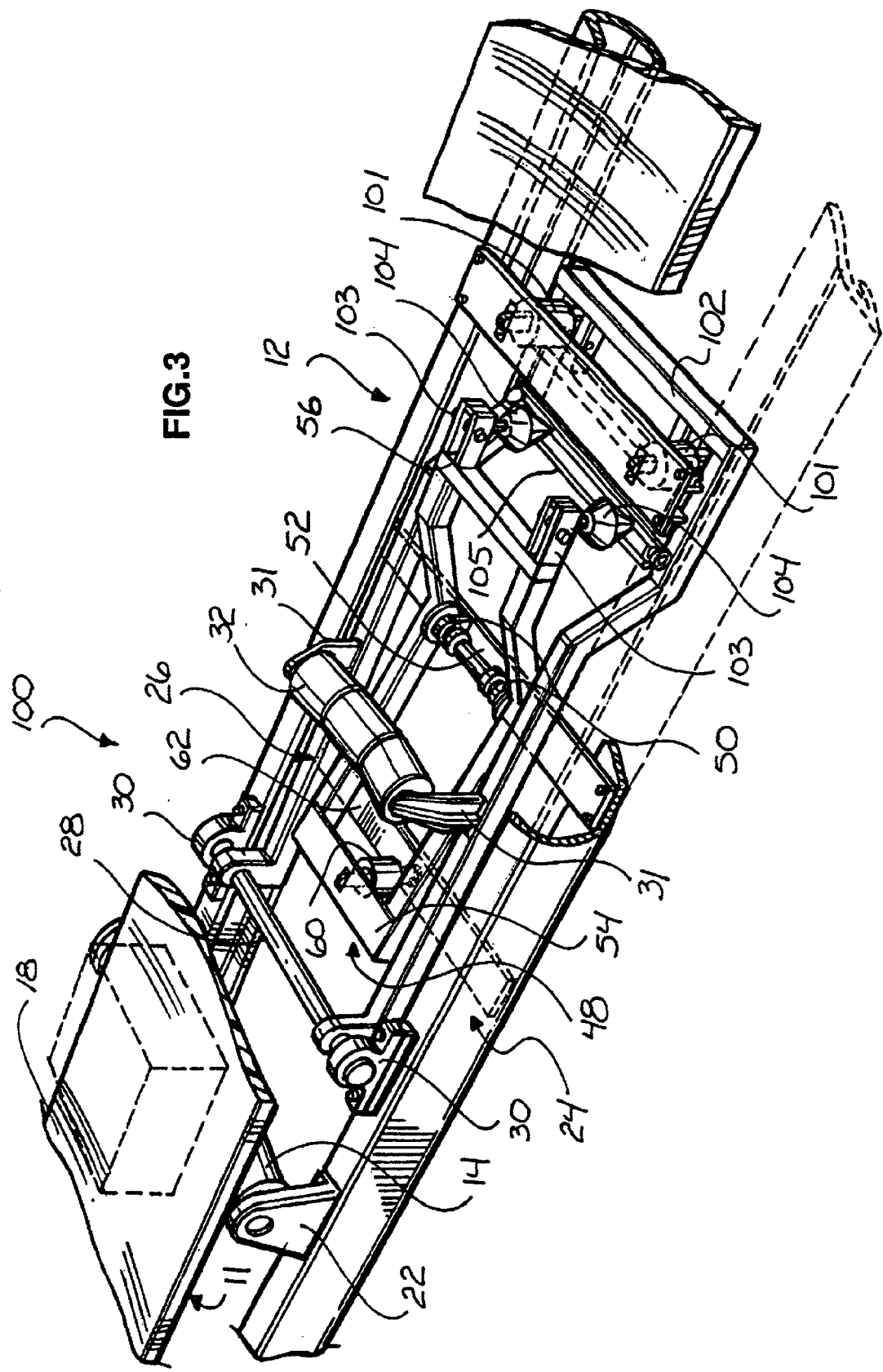
FIG. 3 is a perspective view of a conveyor associated with a weighing and calibrating system, in accordance with the principal of another preferred embodiment of the invention.

Turning now to FIG. 3, illustrated is another embodiment of the invention designated 100. In common with the previously described embodiment designated 10, embodiment 100 shares conveyor 11, weighing system 12, support rollers 14,16 (roller 16 not shown), conveyor belt 18, brackets 22, frame 24, scale beam assembly 26, shaft 28, brackets 30, brackets 31, roller 32, the controller (not illustrated), test beam assembly 48, bracket assembly 50, support frame 52, end portion 54, end portion 56, air cylinder mechanism 60 or other suitable engine as previously explained in connection with the embodiment designated 10 and support frame 62. Unlike the embodiment designated 10, embodiment 100 is furnished with two load cells 101 that overly and are coupled to a distal extremity 102 of scale beam assembly 26. Also, end portion 56 is characterized by attached arms 103 to which are connected in a depending state reference weights 104. A channel 105 underlies reference weights 104 and is attached to scale beam assembly 26 proximate distal extremity 102. Displacement of scale beam assembly 26 in this embodiment 100 results in a pulling force applied to load cells 101. Displacement of test beam assembly 48 applies reference weights 104 against channel 105, which is translated into a pulling force against load cells 101 by scale beam assembly 26. The embodiment designated 100 is instructive for illustrating an arrangement of scale beam assembly 26 and test beam assembly 48 in applying a pulling force against load cells 101. The embodiment designated 100 is also instructive for teaching an implementation of a plurality of load cells and reference weights. The embodiment designated 10 can also be furnished with a plurality of load cells and/or reference weights if desired. Also, although two load cells 101 and two reference weights 104 are illustrated in the embodiment designated 100, more of each can be used if desired.

The present invention is described above with reference to preferred embodiments. However, those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising:
   a conveyor;
   a weighing system that is capable of continually sensing load against the conveyor;
   a calibration system for the weighing system that is capable of selectively applying a reference load to the weighing system without interrupting the ability of the weighing system to sense load against the conveyor; and
   a comparator coupled to the weighing system to compare a continually sensed load from the weighing system with the continually sensed load combined with a reference load from the calibration system.

2. Apparatus of claim 1, the weighing system comprising:
   a pivoted scale engaging the conveyor; and
   a sensor capable of producing load stimulus in response to displacement of the pivoted scale by load applied against the conveyor.

3. Apparatus of claim 2, the calibration system comprising:
   a reference load capable of being displaced; and
   the sensor capable of producing test load stimulus in response to displacement of the pivoted scale by load applied against the conveyor and displacement of the reference load.

4. Apparatus of claim 3, wherein the reference load is supported by a pivoted test beam.

5. Apparatus of claim 4, wherein the pivoted test beam is capable of pivoting between a first position and a second position displacing the reference load.

6. Apparatus of claim 5, further comprising an engine associated with the pivoted test beam and movable between a first condition corresponding to the first position of the test beam and a second condition corresponding to the second position of the test beam.

7. Apparatus of claim 3, further comprising:
   storage maintaining load stimulus data from the sensor commensurate with load applied to the conveyor and a test load stimulus data from the sensor commensurate with a combination of load applied to the conveyor and displacement of the reference load; and
   a controller including the comparator, comparing the load stimulus data to the test load stimulus data and adjusting the weighing system if the comparison of the load stimulus data and the test load stimulus data is unacceptable.

8. In a conveyor continuously moving material, the material applying load to the conveyor, apparatus comprising:
   a weighing system that is capable of continually sensing load against the conveyor, the weighing system including a pivoted scale engaging the conveyor, and a sensor capable of producing load stimulus in response to displacement of the pivoted scale by load applied against the conveyor; and
   a calibration system for the weighing system that is capable of applying a reference load to the weighing system without interrupting the movement of material or the ability of the weighing system to sense load against the conveyor, the calibration system including a reference load capable of being displaced, the reference load supported by a pivoted test beam wherein the pivoted test beam is pivotable between a first position and a second position displacing the reference load, and the sensor capable of producing test load stimulus in response to displacement of the pivoted scale by load applied against the conveyor and displacement of the reference load.

9. Apparatus of claim 8, further comprising an engine associated with the pivoted test beam and movable between a first condition corresponding to the first position of the test beam and a second condition corresponding to the second position of the test beam.

10. Apparatus of claim 8, further comprising:
    storage maintaining load stimulus data from the sensor commensurate with load applied to the conveyor and a test load stimulus data from the sensor commensurate with a combination of load applied to the conveyor and displacement of the reference load; and
    a controller capable of comparing the load stimulus data to the test load stimulus data and adjusting the weighing system if the comparison of the load stimulus data and the test load stimulus data is unacceptable.

11. Apparatus comprising:
    a conveyor having an upper run;
    a weighing system comprising a load sensor and a scale displaced by the upper run of the conveyor so as to act on the load sensor; and
    a reference load capable of being displaced so as to act on the load sensor concurrently with the upper run of the conveyor, the reference load is supported by a pivoted test beam underlying the upper run of the conveyor.

12. Apparatus of claim 11, wherein the pivoted test beam is movable between a first position and a second position displacing the reference load.

13. Apparatus of claim 12, further comprising an engine associated with the pivoted test beam and movable between a first condition corresponding to the first position of the test beam and a second condition corresponding to the second position of the test beam.

14. Apparatus of claim 11, further comprising:
    storage maintaining load stimulus data from the load sensor commensurate with load applied to the conveyor and a test load stimulus data from the load sensor commensurate with a combination of load applied to the conveyor and displacement of the reference load; and
    a controller capable of comparing the load stimulus data to the test load stimulus data and adjusting the weighing system if the comparison of the load stimulus data and the test load stimulus data is unacceptable.

15. In a conveyor and a weighing system that is capable of continually sensing load against the conveyor and generating load stimulus commensurate with the load against the conveyor, a method comprising steps of:

applying a reference load to the weighing system;

generating test load stimulus commensurate with a combination of the load against the conveyor and the reference load against the weighing system;

comparing the test load stimulus with the load stimulus; and adjusting the weighing system if the comparison of the load stimulus and the test load stimulus is unacceptable.

* * * * *